(12) United States Patent
Robbins

(10) Patent No.: US 10,124,403 B2
(45) Date of Patent: Nov. 13, 2018

(54) SHOT SLEEVE FOR DIE CASTING APPARATUS AND METHOD OF FABRICATING SAME

(71) Applicant: EXCO TECHNOLOGIES LIMITED, Markham (CA)

(72) Inventor: Paul Henry Robbins, Port Perry (CA)

(73) Assignee: Exco Technologies Limited, Markham, Ontario (CA)

( * ) Notice: Subject to any disclaimer, the term of this patent is extended or adjusted under 35 U.S.C. 154(b) by 21 days.

(21) Appl. No.: 15/299,905

(22) Filed: Oct. 21, 2016

(65) Prior Publication Data
US 2017/0113269 A1    Apr. 27, 2017

Related U.S. Application Data

(60) Provisional application No. 62/245,099, filed on Oct. 22, 2015.

(51) Int. Cl.
| | |
|---|---|
| *B22D 17/20* | (2006.01) |
| *B23K 31/02* | (2006.01) |
| *C21D 1/30* | (2006.01) |
| *C23C 8/02* | (2006.01) |
| *C23C 8/26* | (2006.01) |
| *B23B 41/06* | (2006.01) |

(52) U.S. Cl.
CPC ....... *B22D 17/2023* (2013.01); *B22D 17/203* (2013.01); *B23K 31/02* (2013.01); *C21D 1/30* (2013.01); *C23C 8/02* (2013.01); *C23C 8/26* (2013.01); *B23B 41/06* (2013.01)

(58) Field of Classification Search
CPC .......................... B22D 17/203; B22D 17/2023
See application file for complete search history.

(56) References Cited

U.S. PATENT DOCUMENTS

| | | | |
|---|---|---|---|
| 3,901,306 A * | 8/1975 | Miki .................... | B22D 17/203 |
| | | | 164/312 |
| 4,596,282 A | 6/1986 | Maddy et al. | |
| 5,195,572 A | 3/1993 | Linden, Jr. et al. | |
| 5,322,111 A | 6/1994 | Hansma | |
| 5,983,977 A | 11/1999 | Nishimura et al. | |
| 9,114,455 B1 | 8/2015 | Donahue et al. | |
| 2006/0213634 A1* | 9/2006 | Kaba .................. | B22D 17/2023 |
| | | | 164/312 |
| 2007/0074842 A1 | 4/2007 | Manoff | |

(Continued)

FOREIGN PATENT DOCUMENTS

| | | |
|---|---|---|
| EP | 0 798 395 A2 | 10/1997 |
| JP | H 10-328804 | 12/1998 |

(Continued)

OTHER PUBLICATIONS

"Bore Welding Shot Sleeves", Castool Tooling Systems, Jul. 2015; http://www.castool.com/product/bore-welding-short-sleeves.

(Continued)

*Primary Examiner* — Kevin E Yoon
*Assistant Examiner* — Steven S Ha

(57) ABSTRACT

A shot sleeve for a die-casting apparatus is described. The shot sleeve has a piston bore, and comprises an elongate body having an axial bore, and a sleeve liner formed on a surface of the axial bore. The sleeve liner defines a surface of the piston bore.

20 Claims, 12 Drawing Sheets

(56) References Cited

U.S. PATENT DOCUMENTS

2007/0187061 A1\* 8/2007 Siddle ............... B22D 17/2023
164/312
2011/0011900 A1 1/2011 Fischer
2015/0266088 A1 9/2015 Shimizu et al.

FOREIGN PATENT DOCUMENTS

| JP | H 11-320066 | 11/1999 | | |
|---|---|---|---|---|
| WO | WO 90/10516 | 9/1990 | | |
| WO | WO 97/21509 | 6/1997 | | |
| WO | WO 99/16565 | 4/1999 | | |
| WO | WO-2015076749 A1 \* | 5/2015 | ......... | B22D 17/2023 |

OTHER PUBLICATIONS

Robbins, et al., "High Pressure Die Casting Structural Aluminum", Castool Tooling Systems, Jun. 2014; www.diecasting.org/links.
Robbins, Paul, "Plunger System for Silafont", Castool Tooling Systems, Sep. 2014, www.diecasting.org/dge.
PCT/CA2016/0151225 International Search Report and Written Opinion, dated Dec. 14, 2016.

\* cited by examiner

SHOT SLEEVE FOR DIE CASTING APPARATUS AND METHOD OF FABRICATING SAME

CROSS-REFERENCE TO RELATED APPLICATION

The application claims the benefit of U.S. Application No. 62/245,099 filed on Oct. 22, 2015, the content of which is incorporated herein by reference in its entirety.

FIELD

The subject disclosure relates generally to die-casting and in particular, to a shot sleeve for a die-casting apparatus and a method of fabricating the same.

BACKGROUND

In the field of automotive manufacturing, structural components that historically have been fabricated of steel, such as engine cradles, are increasingly being replaced with aluminum alloy castings. Such castings are typically large, convoluted, and relatively thin, and are required to meet the high quality standards of automotive manufacturing. In order to meet these requirements, vacuum-assisted die-casting is typically used to produce such castings.

Vacuum-assisted die-casting machines comprise a piston, sometimes referred to as a "plunger", which is advanced through a piston bore of a shot sleeve to push a volume of liquid metal into a mold cavity. Vacuum is applied to the piston bore to assist the flow of the liquid metal therethrough. A replaceable wear ring is fitted onto the piston, and makes continuous contact with the inside of the piston bore along the full stroke of the piston for providing a seal for both the vacuum and liquid metal.

For example, FIG. 1 shows a portion of a prior art vacuum-assisted die-casting apparatus, which is generally indicated by reference numeral 20. Vacuum-assisted die-casting apparatus 20 comprises a piston that is moveable within a piston bore 28 defined within a shot sleeve 30 for pushing a volume of liquid metal (not shown) into a die-casting mold cavity (not shown) to form a casting. In the example shown, the piston is positioned at its starting position of the stroke, which is rearward of a port 34 through which the volume of liquid metal is introduced into the piston bore 28.

The piston comprises a piston tip 40 mounted on a forward end of a piston stem (not shown). The piston tip 40 has a front face 42 that is configured to contact the volume of liquid metal introduced into the piston bore 28 via port 34. The piston tip 40 has a wear ring 44 disposed on an outer surface thereof.

In operation, at the beginning of a stroke cycle, the piston is positioned at its starting position in the piston bore 28, and a volume of liquid metal is introduced into the piston bore 28 forward of the piston tip 40 via port 34. The piston is then moved forward through the piston bore 28 to push the volume of liquid metal into the mold cavity for forming a metal casting, and is then moved rearward to its starting position to complete the stroke cycle. During this movement, the wear ring 44 disposed on the piston tip 40 continuously contacts the surface 48 of the piston bore 28, and provides a liquid metal seal for preventing liquid metal from passing between the piston tip 40 and the surface 48 of the piston bore 28. The wear ring 44 also provides a vacuum seal for maintaining vacuum (that is, a low pressure) within the forward volume of the piston bore 28. The cycle is repeated, as desired, to produce multiple metal castings.

As will be understood, the continuous contact between the piston and the piston bore 28 wears the surface 48 of the piston bore over many stroke cycles, and thereby limits the service life of the shot sleeve.

Die-casting shot sleeves having improved wear resistance have been described. For example, U.S. Pat. No. 5,195,572 to Linden, Jr. et al. discloses a two-piece shot sleeve for use with a die casting machine including first and second cylindrical sleeve sections that are removably axially secured together. The sleeve sections are each open at both ends and include an interior passage for the flow of molten metal, and the second sleeve section includes a pour hole for receiving molten metal into the interior passage.

U.S. Pat. No. 5,322,111 to Hansma discloses a lined shot sleeve for use in metal die casting. The lined shot sleeve comprises an elongated main body portion including a first continuous inner wall surface defining a receptacle bore axially extending between a first end and a second end of the main body portion. An elongated ceramic liner is adapted for secure placement within the receptacle bore, the liner including a second continuous inner wall surface defining a cylinder bore axially extending between a first end and a second end of the liner and an exterior wall surface adapted for frictional contact with the first continuous inner wall surface. The ceramic liner acts as a physical and thermal insulator to protect the first continuous inner wall surface of the main body portion from contact with the molten metal.

It is an object at least to provide a novel shot sleeve for a die-casting apparatus and method of fabricating the same.

SUMMARY

Accordingly, in one aspect there is provided a shot sleeve for a die-casting apparatus, the shot sleeve having a piston bore, the shot sleeve comprising: an elongate body having an axial bore; and a sleeve liner formed on a surface of the axial bore, the sleeve liner defining a surface of the piston bore.

The sleeve liner may comprise a nitride surface layer defining the surface of the piston bore.

The elongate body may be fabricated of a first material and the sleeve liner may be fabricated of a second material, the second material having at least one of: higher hardness than the first material; higher high-temperature yield strength than the first material; and higher aluminum corrosion resistance than the first material. The body may be fabricated of AISI 4340 grade steel. The shot sleeve may be fabricated of hot worked DIN 1.2367 grade steel.

The sleeve liner may be integrally formed on the surface of the axial bore. The sleeve liner may be a welded layer.

The shot sleeve may further comprise: a sleeve insert accommodated in the axial bore adjacent the sleeve liner, the sleeve insert defining an additional surface of the piston bore. The axial bore may comprise a first axial bore segment and a second axial bore segment, the first axial bore segment accommodating the sleeve insert, and the sleeve liner being formed on the surface of the second axial bore segment. The body may comprise a port through which a volume of liquid metal is introduced into the piston bore, the sleeve insert having an aperture aligned with the port. The sleeve insert may comprise an axial cut configured to allow the sleeve insert to be circumferentially compressed. The sleeve insert may comprise a nitride surface layer defining the additional surface of the piston bore. The elongate body may fabricated of a first material and the sleeve insert may be fabricated of a second material, the second material having at least one of:

higher hardness than the first material; higher high-temperature yield strength than the first material; and higher aluminum corrosion resistance than the first material. The body may be fabricated of AISI 4340 grade steel. The sleeve insert may be fabricated of hot worked DIN 1.2367 grade steel.

In one embodiment, there is provided a die-casting apparatus comprising the shot sleeve referred to above.

In another aspect, there is provided a method of fabricating a shot sleeve for a die-casting apparatus, the shot sleeve having a piston bore, the method comprising: providing an elongate shot sleeve body having an axial bore; and forming a sleeve liner on a surface of the axial bore, the sleeve liner defining a surface of the piston bore.

The forming may comprise forming the sleeve liner by welding.

The method may further comprise: subjecting the shot sleeve to heat treatment after said forming to reduce residual stress.

The method may further comprise conically boring the axial bore to form a conical surface.

The method may further comprise: honing a surface of the sleeve liner to a desired surface roughness. The method may further comprise: forming a nitride surface layer on the sleeve liner after honing.

The method may further comprise: inserting a sleeve insert into the axial bore, the sleeve insert defining an additional surface of the piston bore. Inserting the sleeve insert may comprise positioning the sleeve insert against the sleeve liner in an abutting manner.

BRIEF DESCRIPTION OF THE DRAWINGS

Embodiments will now be described more fully with reference to the accompanying drawings in which.

DETAILED DESCRIPTION OF EMBODIMENTS

Figure 1:
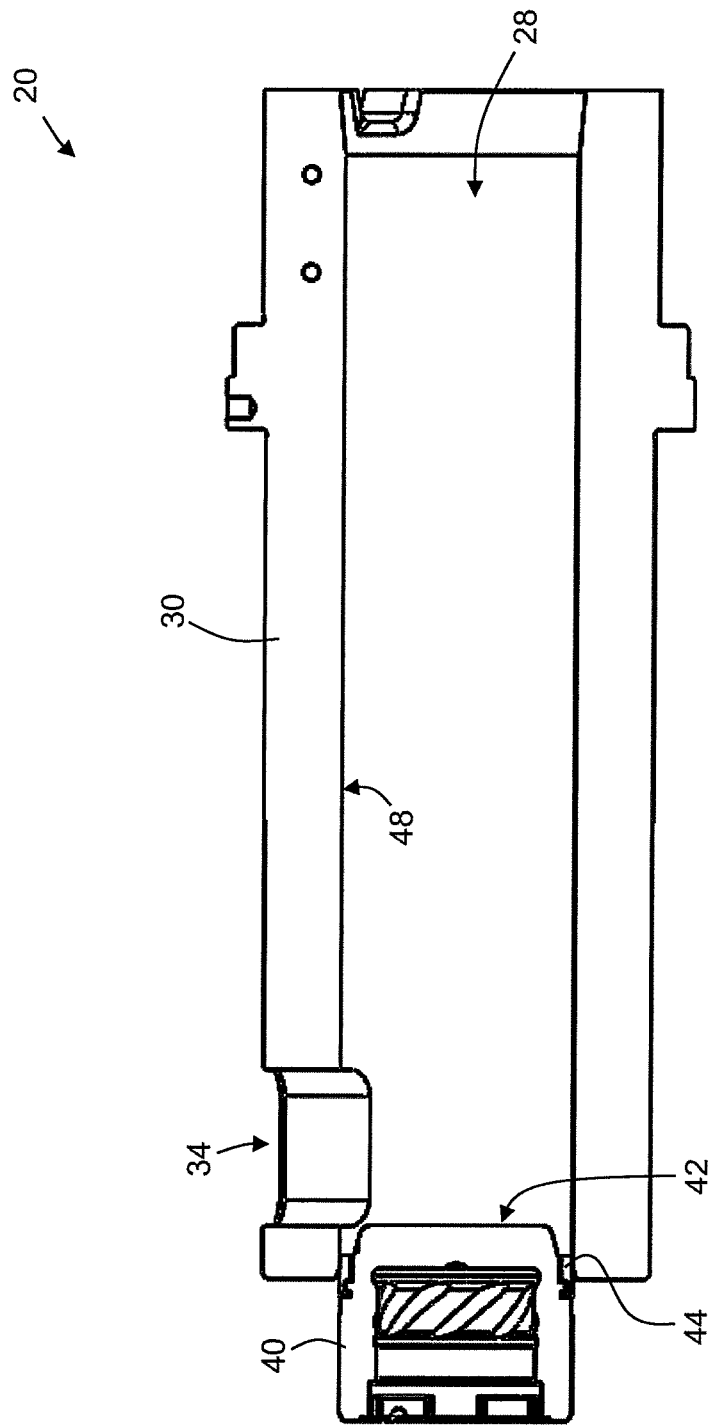
FIG. 1 is a side sectional view of a portion of a prior art die-casting apparatus, comprising a prior art shot sleeve and a piston tip of a piston.
Figure 2:
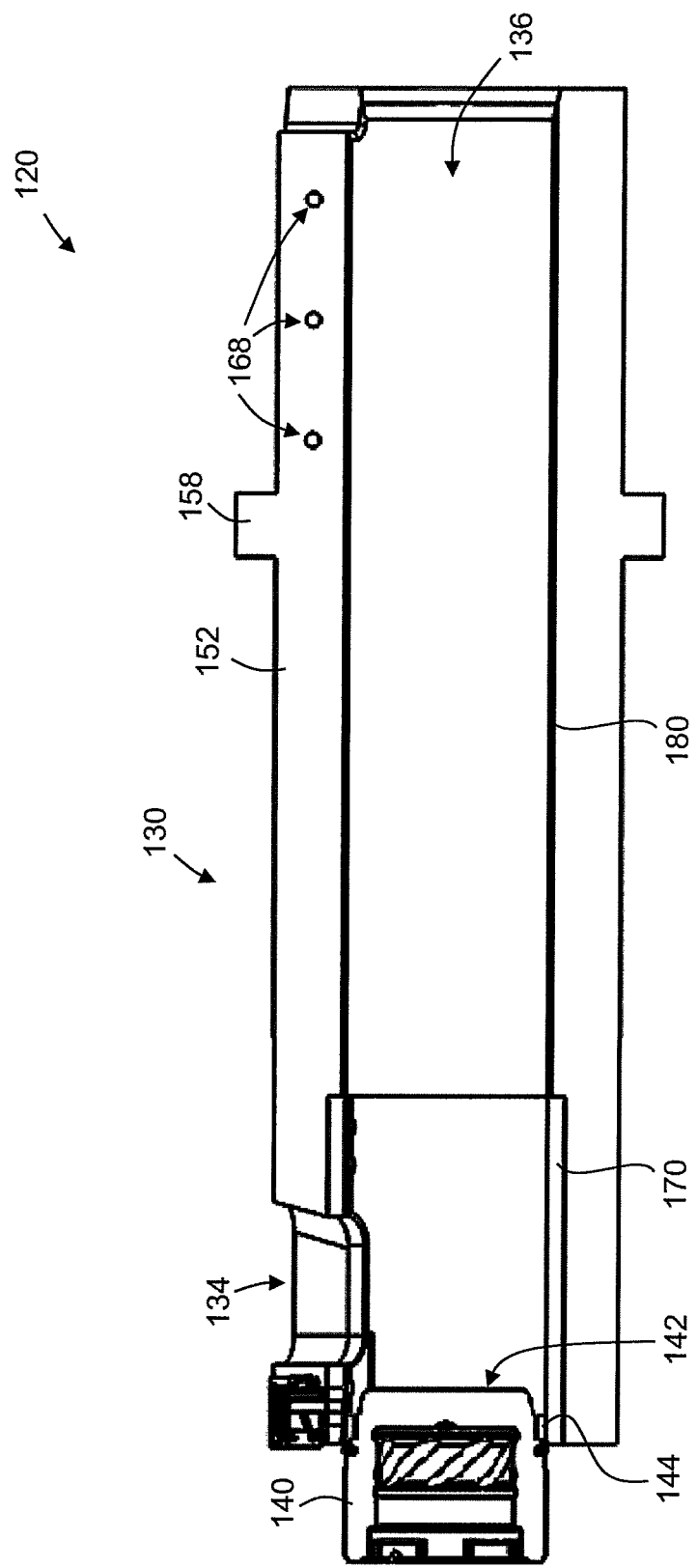
FIG. 2 is a side sectional view of a portion of a die-casting apparatus, comprising a shot sleeve and a piston tip of a piston.
Figure 3:
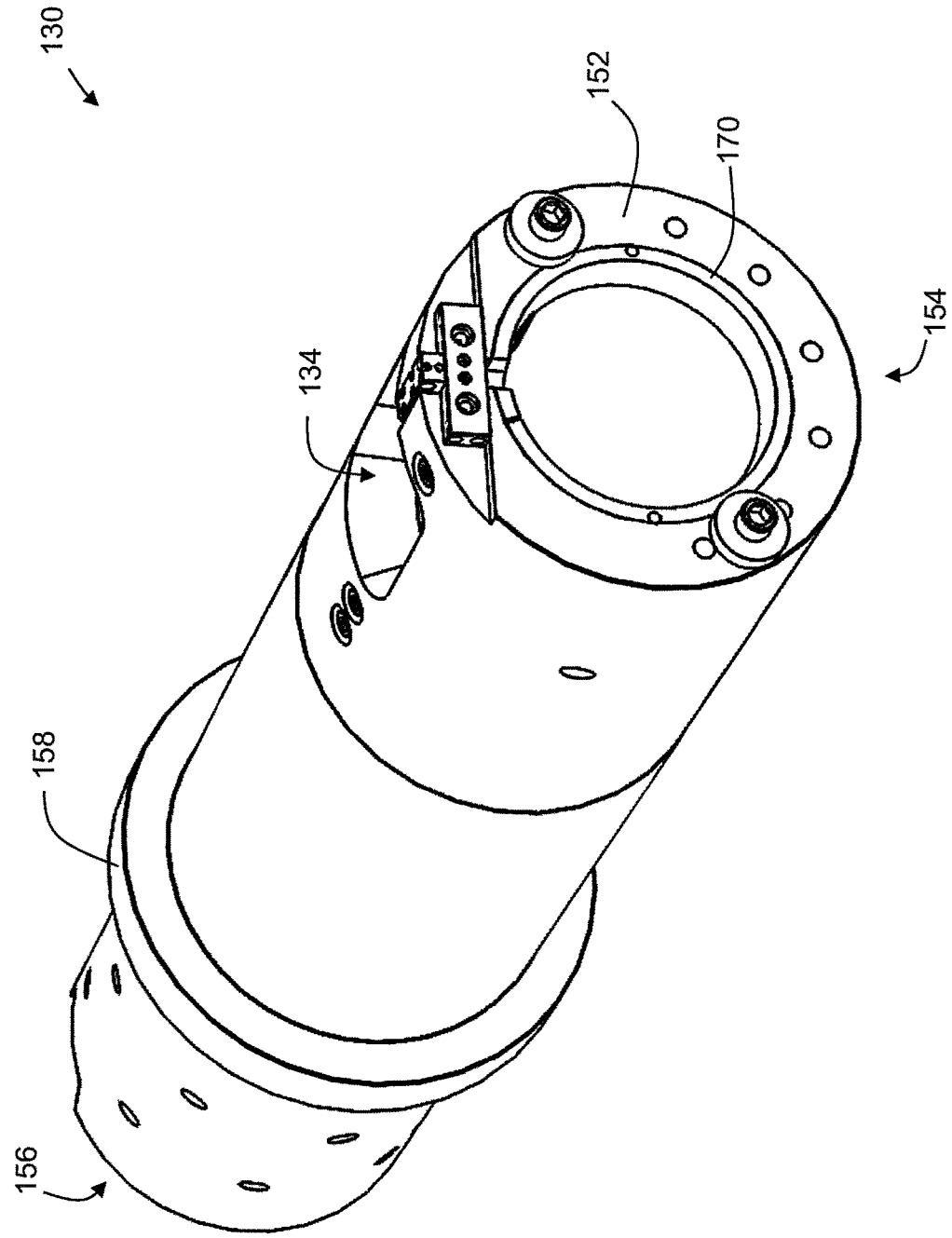
FIG. 3 is a perspective view of the shot sleeve of FIG. 2.
Figure 4:
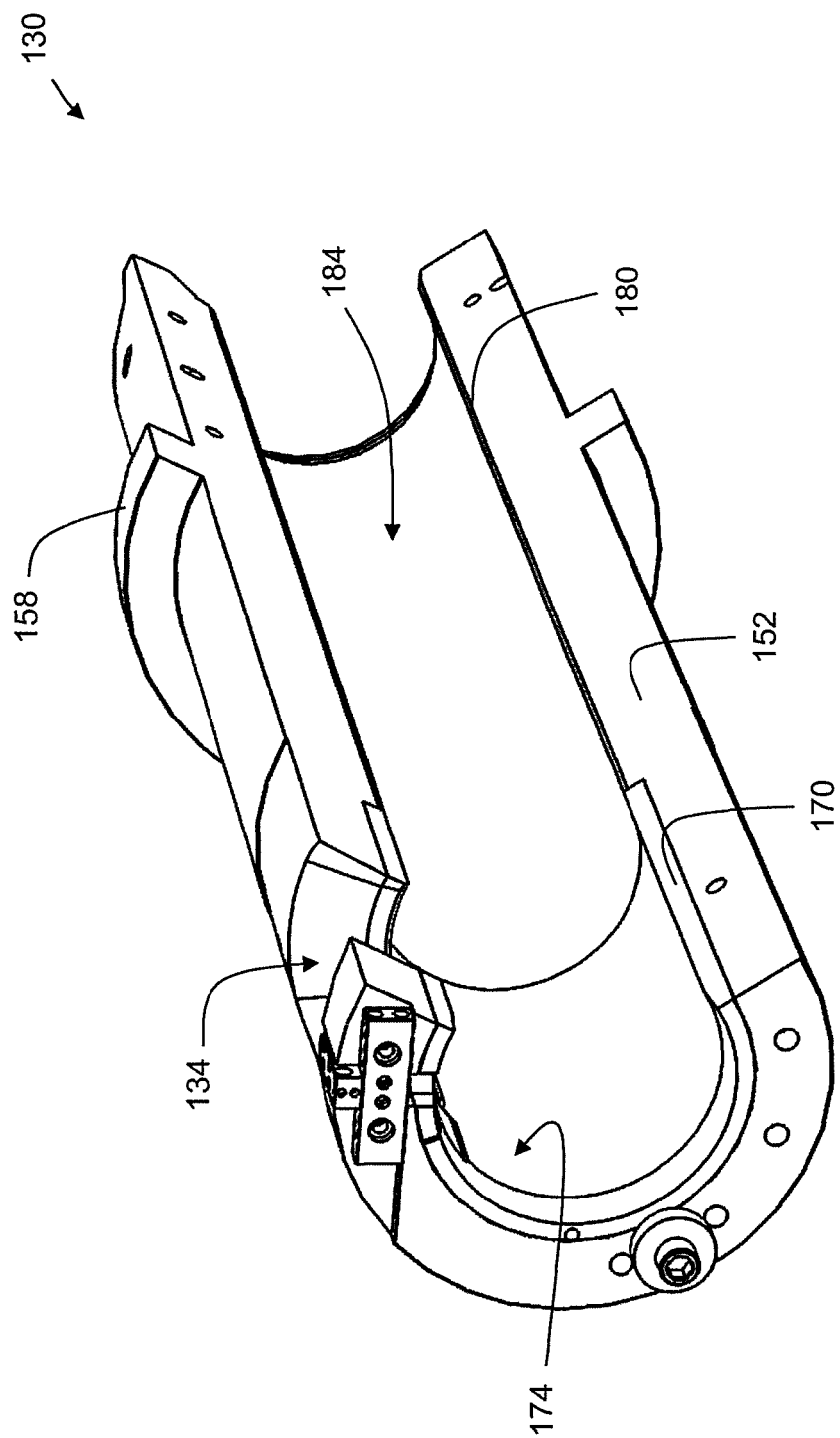
FIG. 4 is a perspective sectional view of the shot sleeve of FIG. 2.
Figure 5:
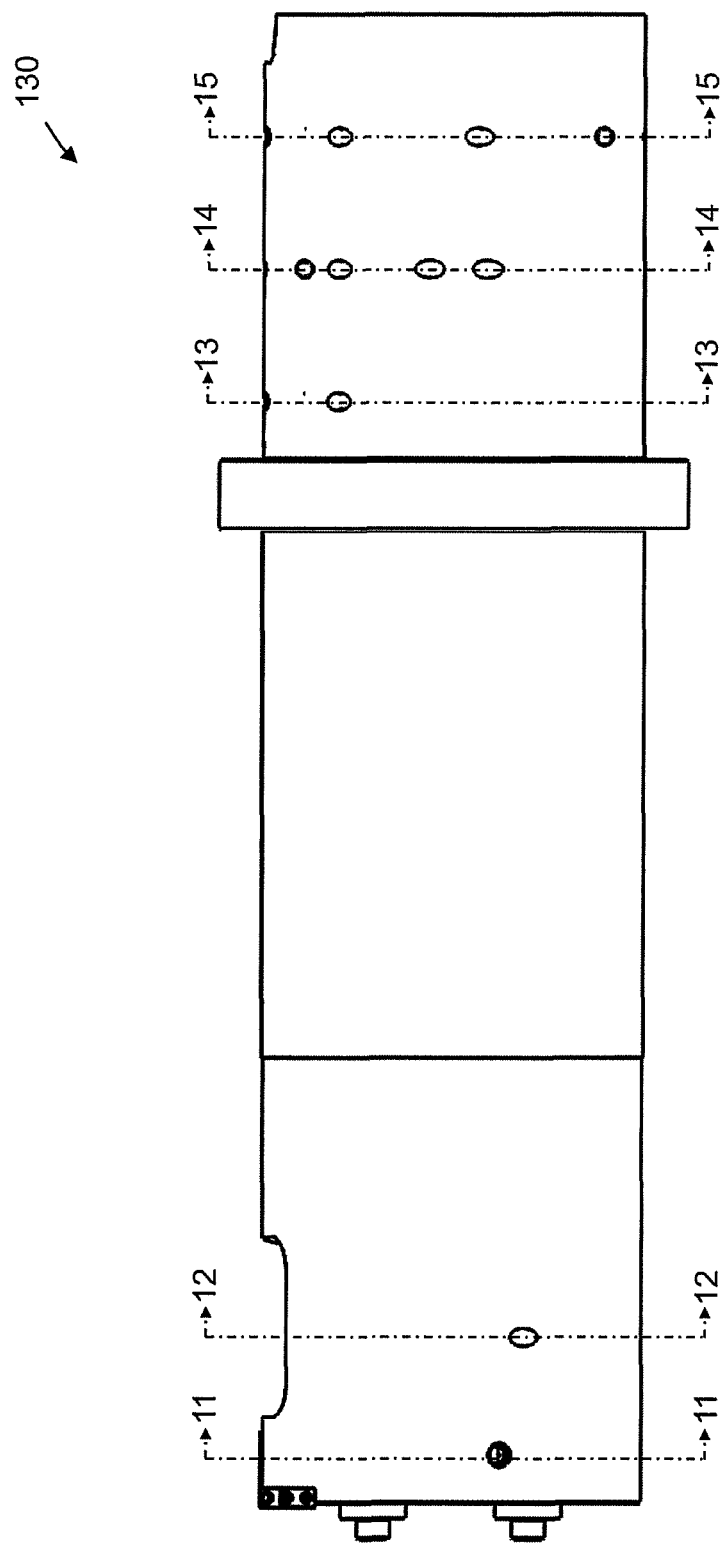
FIG. 5 is a side view of the shot sleeve of FIG. 2.
Figure 6:
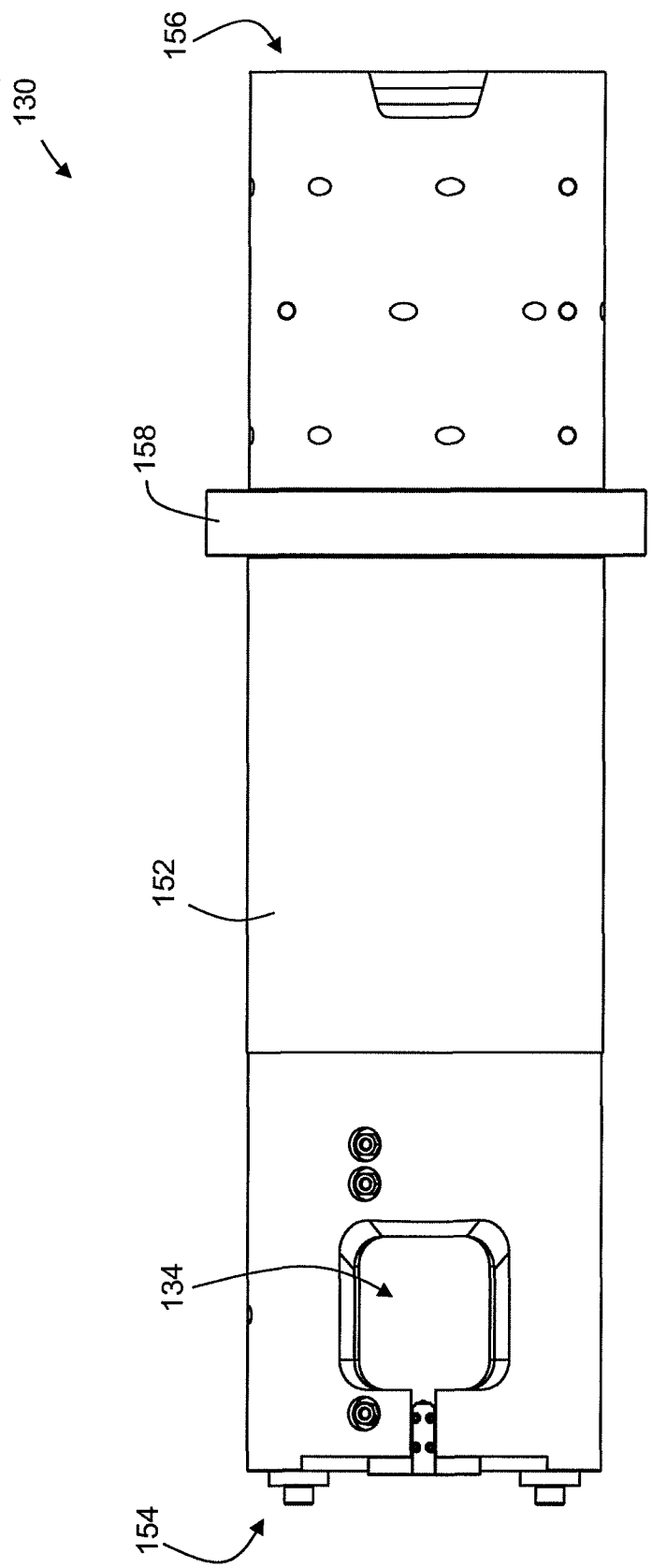
FIG. 6 is a top view of the shot sleeve of FIG. 2.
Figure 8:
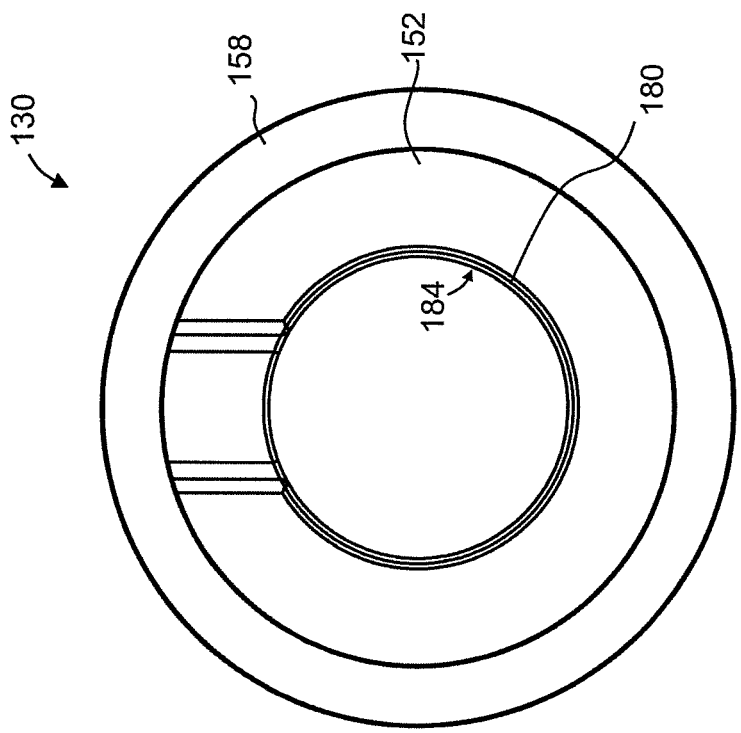
FIG. 8 is a die end view of the shot sleeve of FIG. 2.
Figure 7:
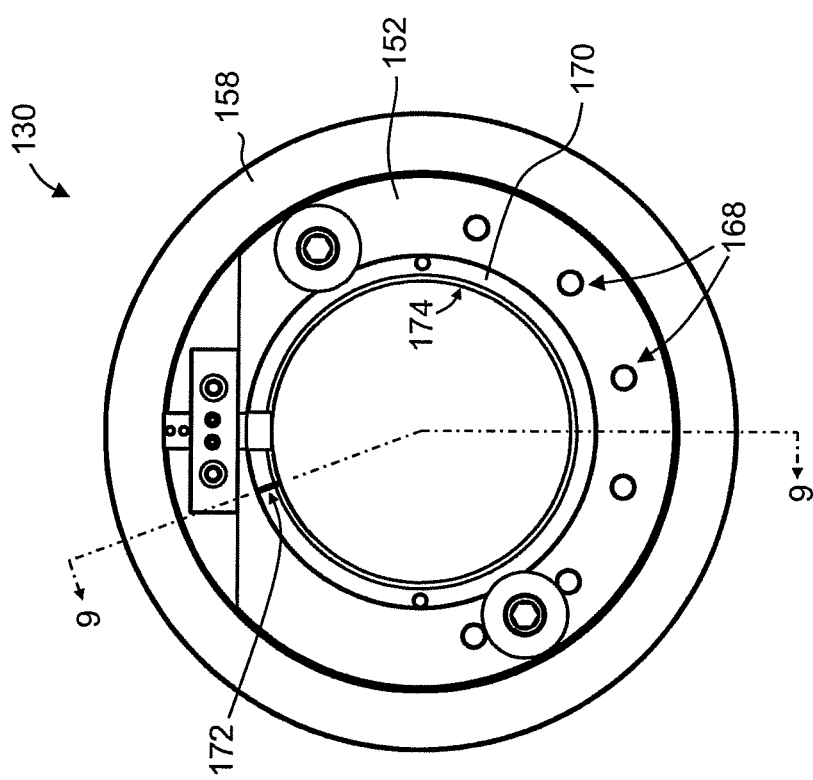
FIG. 7 is a pour end view of the shot sleeve of FIG. 2.
Figure 9:
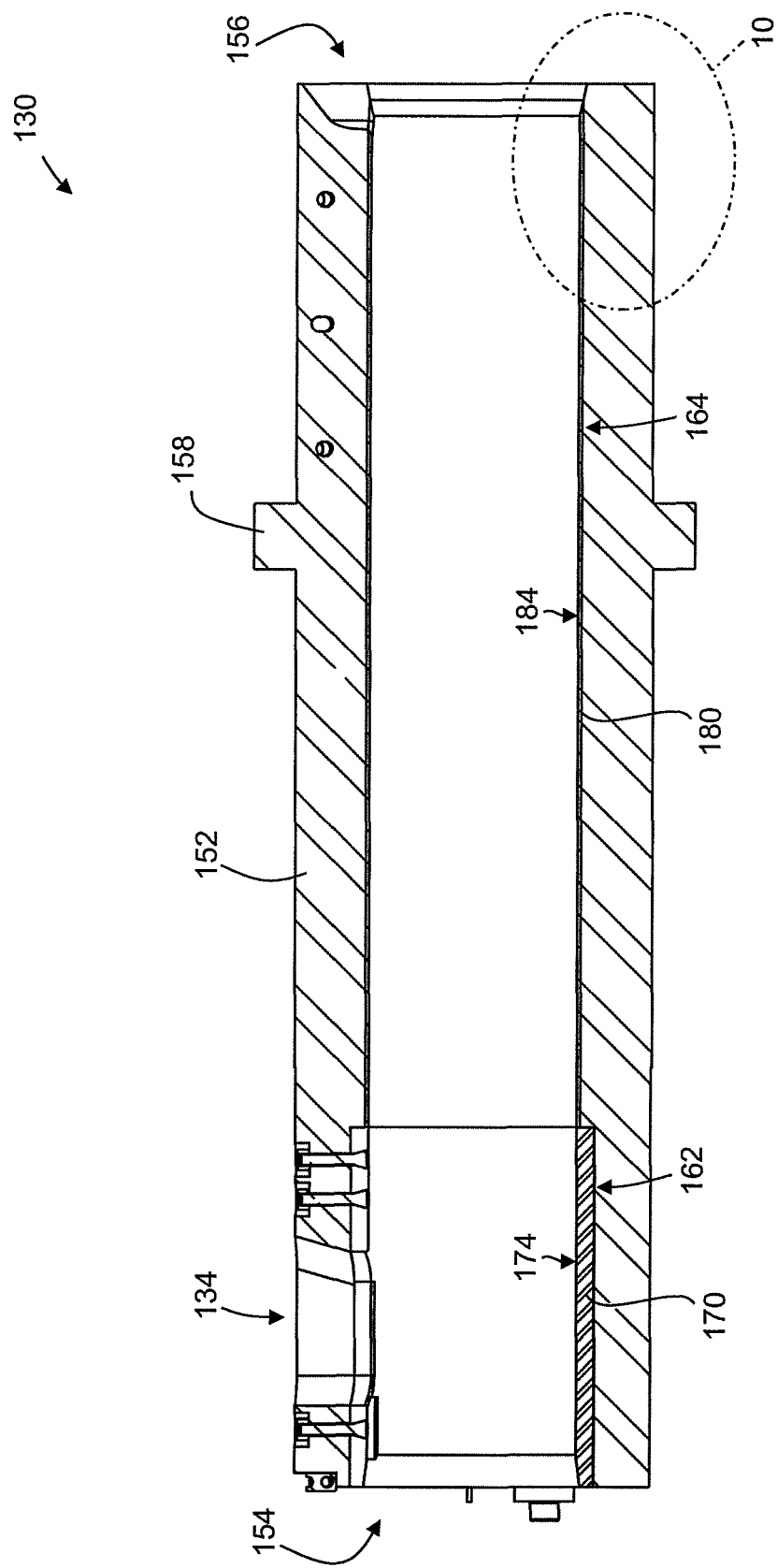
FIG. 9 is a side sectional view of the shot sleeve of FIG. 7, taken along the indicated section line.
Figure 10:
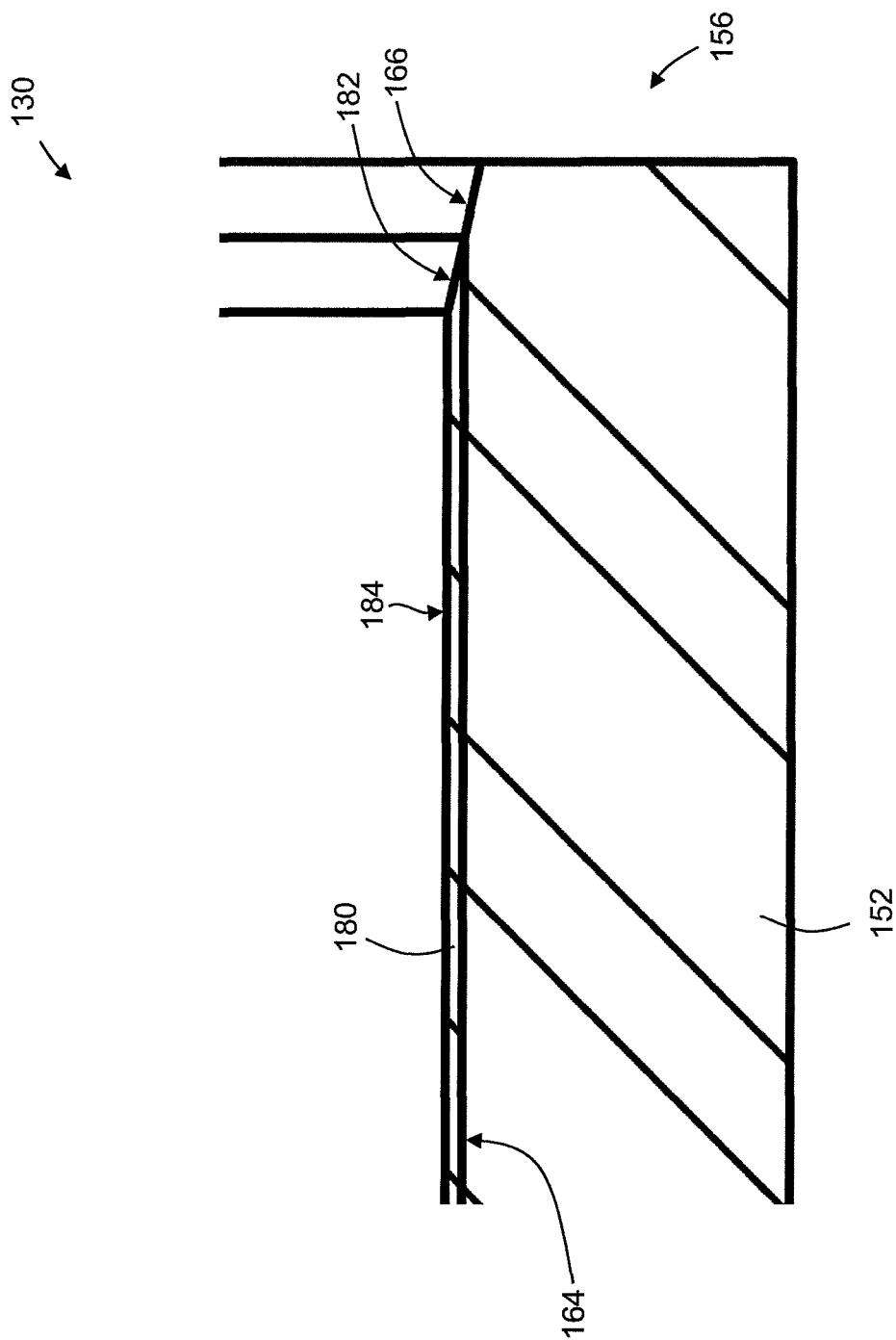
FIG. 10 is an enlarged fragmentary view of a portion of the shot sleeve of FIG. 9 identified by reference numeral 10.
Figure 12:
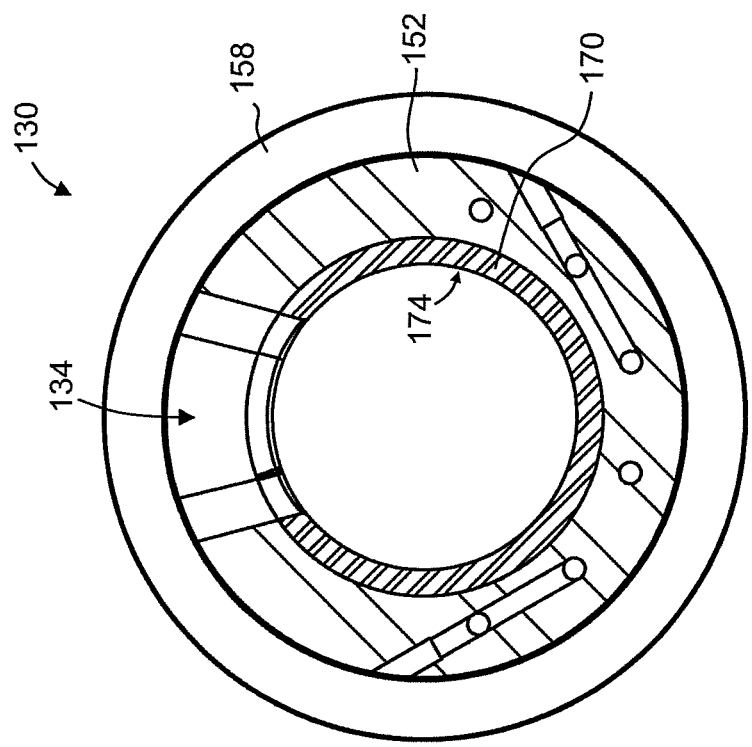
FIGS. 11, 12, 13, 14 and 15 are sectional views of the shot sleeve of FIG. 5, taken along the indicated section lines.
Figure 11:
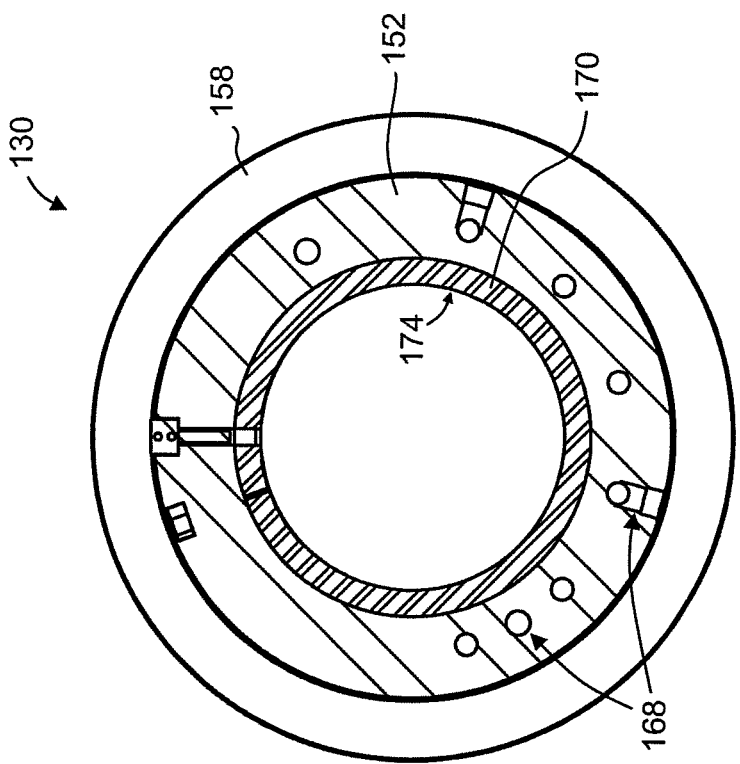
Figure 14:
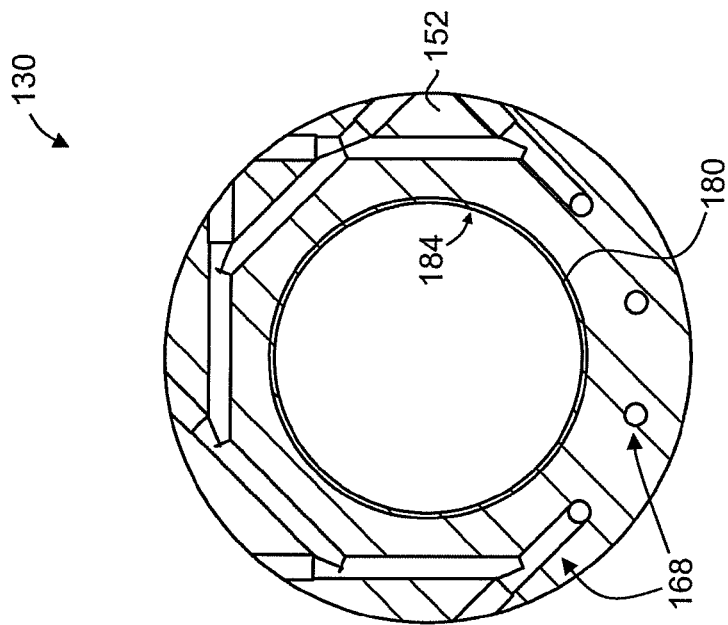
Figure 13:
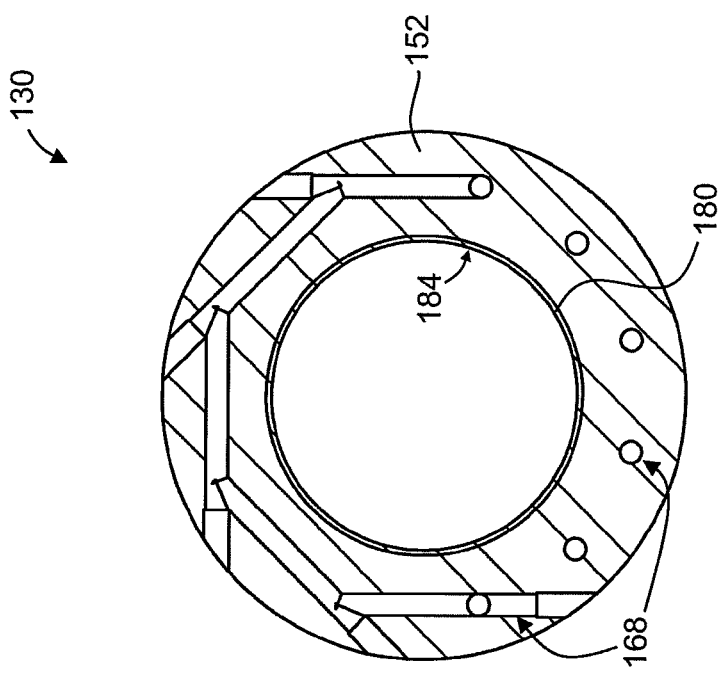
Figure 15:
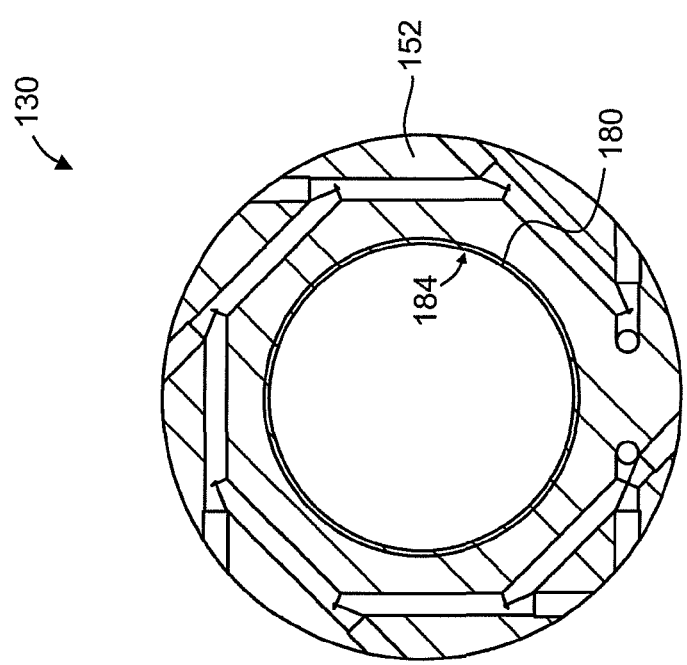

Turning now to FIG. 2 a portion of a vacuum-assisted die-casting apparatus is shown, and is generally indicated by reference numeral 120. Vacuum-assisted die-casting apparatus 120 comprises a piston that is moveable within a piston bore defined within a shot sleeve 130 for pushing a volume of liquid metal (not shown) into a die-casting mold cavity (not shown) to form a casting. The shot sleeve 130 comprises a port 134 through which the volume of liquid metal is introduced into the piston bore 136, and in the example shown, the piston is positioned at its starting position of the stroke, which is rearward of the port 134.

The piston comprises a piston tip 140 mounted on a forward end of a piston stem (not shown). The piston tip 140 has a front face 142 that is configured to contact the volume of liquid metal introduced into the piston bore 136 via port 134. The piston tip 140 has a wear ring 144 disposed on an outer surface thereof.

The shot sleeve 130 may be better seen in FIGS. 3 to 15. The shot sleeve 130 comprises an elongate shot sleeve body 152 fabricated of a material that has higher toughness and higher thermal conductivity than commonly used tool steels, and in this embodiment the body 152 is fabricated of AISI 4340 grade steel. For example, the toughness (at 44 HRC hardness) of AISI 4340 grade steel is about 42 J/m$^3$, while the toughness (at 44 HRC hardness) of AISI H13 grade steel, a commonly used tool steel, is about 24 J/m$^3$. As another example, the thermal conductivity of AISI 4340 grade steel is about 42 W/(m·K), while the thermal conductivity of AISI H13 grade steel is about 25 W/(m·K). Body 152 has a pour end 154 and a die end 156, and an outwardly-extending circumferential flange 158 for enabling the shot sleeve 130 to be mechanically coupled to a die platen (not shown) or a machine platen (not shown) of the die-casting apparatus 120. The body 152 has an axial bore extending therethrough, and in this embodiment the axial bore comprises a first axial bore segment 162 and a second axial bore segment 164. The first axial bore segment 162 extends partially into the length of the body 152 from the pour end 154, and the second axial bore segment 164 extends partially into the length of the body 152 from the die end 156. The first and second axial bore segments 162 and 164 are axially aligned, and in the embodiment shown the first axial bore segment 162 has a larger diameter than the second axial bore segment 164. At the die end 156, the second axial bore segment 164 has a conical inner surface 166 that is inclined relative to the center axis of the body 152. The body 152 also has a plurality of internal conduits 168 surrounding the first and second axial bore segments 162 and 164, which are configured to convey cooling fluid from a cooling fluid source (not shown) for cooling the shot sleeve 130 during operation. The cooling fluid may be water, oil, air, and the like.

The shot sleeve 130 comprises a replaceable sleeve insert 170 accommodated within the first axial bore segment 162 of the body 152. The sleeve insert 170 is fabricated of a material that has higher hardness, higher high-temperature (namely, from about 625° C. to about 825° C.) yield strength and higher aluminum (Al) corrosion resistance than the shot sleeve body 152, and in this embodiment the sleeve insert 170 is fabricated of hot worked DIN 1.2367 grade steel. As will be understood, DIN 1.2367 grade steel has higher hardness, higher high-temperature yield strength and higher aluminum (Al) corrosion resistance than AISI 4340 grade steel, while AISI 4340 grade steel has higher toughness and higher thermal conductivity than DIN 1.2367 grade steel. The sleeve insert 170 has an axial cut 172 configured to allow the sleeve insert 170 to be circumferentially compressed during insertion into and removal from the body 152. The sleeve insert 170 also has an aperture aligned with the port 134. The sleeve insert 170 has a nitride surface layer 174 that is formed during a nitriding treatment prior to insertion of the sleeve insert 170 into the body 152. The nitride surface layer 174 has a thickness in the range of from about 0.20 mm to about 0.25 mm. As will be understood, the nitride surface layer 174 has higher hardness and higher high-temperature (namely, from about 625° C. to about 825°

C.) yield strength, and therefore greater high-temperature stability, than the interior bulk of the sleeve insert 170.

The shot sleeve 130 also comprises a sleeve liner 180 formed on the surface of the second axial bore segment 164 of the body 152. The sleeve liner 180 is fabricated of a material that has higher hardness, higher high-temperature (namely, from about 625° C. to about 825° C.) yield strength and higher Al corrosion resistance than the body 152, and in this embodiment the sleeve liner 180 is fabricated of DIN 1.2367 grade steel. The sleeve liner 180 is formed by welding a layer of steel onto the surface of the second axial bore segment 164 of the body 152, and then grinding and honing the welded steel layer to a desired thickness and a desired surface roughness. In this embodiment, the thickness of the ground and honed welded steel layer is about 1.5 mm, and the value of the root mean squared (RMS) surface roughness of the ground and honed welded steel layer is about 3, or less. The sleeve liner 180 also has a conical inner surface 182 at the die end 156 that is generally coplanar with the conical inner surface 166 of the body. The sleeve liner 180 has a nitride surface layer 184 that is formed during a nitriding treatment of the shot sleeve after the welded steel layer has been ground and honed. Similar to nitride surface layer 174, the nitride surface layer 184 has a thickness in the range of from about 0.20 mm to about 0.25 mm. As will be understood, the nitride surface layer 184 has higher hardness and higher high-temperature (namely, from about 625° C. to about 825° C.) yield strength, and therefore greater high-temperature stability, than the interior bulk of the sleeve liner 180. Additionally, and as will be understood, by welding the layer of steel onto the surface of the second axial bore segment 164 of the body 152, the layer of steel and the body 152 are joined inseparably and such that the layer of steel and the body 152 have an effectively unitary structure. As a result, the sleeve liner 180 is integrally formed on the surface of the second axial bore segment 164 of the body 152.

In use, during fabrication of the shot sleeve 130, a prior art shot sleeve 30 is decoupled from the die casting apparatus. The piston bore 28 is bored further by at least 3.0 mm (or, at least 1.5 mm per surface) to remove worn surface material, so as to form the first and second axial bore segments 162 and 164, and to thereby provide a shot sleeve body. As will be understood, the worn surface material may comprise micro-cracks and/or a previous nitride surface layer. Alternatively, a new body 152 fabricated of a suitable material, such as AISI 4340 grade steel, and having the first and second axial bore segments 162 and 164 formed therein, may be provided as the shot sleeve body. The shot sleeve body is then heated to a preheat temperature to enable good weld adhesion, with the specific preheat temperature depending on the grade of steel to be used for the welded steel layer. In this embodiment, the preheat temperature is in the range of from about 300° C. to about 450° C. The layer of steel, which has a thickness of about 3.0 mm, is then welded onto the surface of the second axial bore segment 164 of the preheated shot sleeve body. The shot sleeve body and the welded steel layer therein are then subjected to heat treatment to reduce residual stress generated during welding, with the specific time and temperature profile of the heat treatment depending on the grade of steel of the welded steel layer. In this embodiment, the heat treatment includes temperatures in the range of from about 300° C. to about 450° C. The welded steel layer is then ground to reduce its thickness to about 1.5 mm, and the shot sleeve is then conically bored at its die end 156 to form the conical inner surface 182. After grinding and conically boring, the welded steel layer is honed to a desired final dimension to reduce the RMS surface roughness value to about 3, or less, to yield the sleeve liner 180. The shot sleeve body 152 and sleeve liner 180 therein are then subjected to a nitriding treatment to form the nitride surface layer 184. During the nitriding treatment, the shot sleeve body 152 and sleeve liner 180 therein are subjected to a nitriding temperature in a nitriding atmosphere, and in this embodiment the nitriding temperature is in the range of from about 500° C. to about 550° C. The sleeve insert 170 is fabricated separately so as to have generally identical inner diameter and RMS surface roughness as the sleeve liner 180, and to have the nitride surface layer 174. The sleeve insert 170 is inserted into the first axial bore segment 162 of the body 152, and against the sleeve liner 180 in an abutting manner, so as to yield the shot sleeve 130. As will be understood, the sleeve insert 170 and the sleeve liner 180 define the surface of the piston bore 136 of the shot sleeve 130. More specifically, in this embodiment, the nitride surface layer 174 of the sleeve insert 170 and the nitride surface layer 184 of the sleeve liner 180 define the surface of the piston bore 136 of the shot sleeve 130.

In operation, at the beginning of a stroke cycle, the piston is positioned at its starting position in the piston bore 136, and a volume of liquid metal is introduced into the piston bore 136 forward of the piston tip 140 via port 134. The piston is then moved forward through the piston bore 136 to push the volume of liquid metal into the mold cavity for forming a metal casting, and is then moved rearward to its starting position to complete the stroke cycle. During this movement, the wear ring 144 disposed on the piston tip 140 continuously contacts the surface of the piston bore 136, and provides a liquid metal seal for preventing liquid metal from passing between the piston tip 140 and the surface of the piston bore 136. The wear ring 144 also provides a vacuum seal for maintaining vacuum (that is, a low pressure) within the forward volume of the piston bore 136. The cycle is repeated, as desired, to produce multiple metal castings.

As will be appreciated, the high hardness and the high high-temperature yield strength of the sleeve insert 170 and sleeve liner 180 advantageously increase the resistance of the shot sleeve 130 to "heat checking", namely the formation and propagation of cracks on the surface of the piston bore due to the temperature changes associated with each stroke cycle. As a result, the likelihood of failure of the shot sleeve 130 due to heat checking is reduced or eliminated, as compared to conventional shot sleeves fabricated of commonly used tool steels.

As will be appreciated, the high toughness of the body 152 advantageously increases the resistance of the shot sleeve 130 to thermal shock cracking. As a result, the likelihood of failure of the shot sleeve 130 due to thermal shock cracking is reduced or eliminated, as compared to conventional shot sleeves fabricated of commonly used tool steels. Additionally, and as will be appreciated, the high thermal conductivity of the body 152 advantageously increases thermal dissipation within the shot sleeve 130. As a result, the shot sleeve 130 has a more uniform temperature distribution and experiences less shape distortion due to thermal expansion, as compared to conventional shot sleeves fabricated of commonly used tool steels.

As will be appreciated, the sleeve insert 170 and the sleeve liner 180 advantageously increase the hardness, the high-temperature yield strength and the Al corrosion resistance of the piston bore 136, without requiring the entire shot sleeve 130 to be fabricated of a material having high hardness, high high-temperature yield strength and high Al corrosion resistance. As will be understood, fabricating the entire shot sleeve of a material having high hardness would otherwise render the shot sleeve brittle, while fabricating the entire shot sleeve of a material having a high high-temperature yield strength and/or a high Al corrosion resistance would otherwise render the shot sleeve too costly. Further, and as will be appreciated, the high hardness of the sleeve insert 170 and the sleeve liner 180, as compared to the body 152, allows the shot sleeve 130 to have a combination of high hardness and high toughness. As will be understood, materials having high hardness typically have low toughness, while materials having high toughness typically have low hardness.

As will be appreciated, by integrally forming the sleeve liner 180 on the surface of the second axial bore segment 164 of the body 152, which advantageously eliminates the likelihood of the sleeve liner 180 from becoming separated from the body 152 during use.

These features advantageously enable the shot sleeve 130 to be more durable and to have a longer service life than conventional shot sleeves.

Additionally, and as will be appreciated, the conical inner surfaces 166 and 182 of the shot sleeve 130 advantageously enable the metal casting to be more easily removed from the mold cavity. The conical inner surfaces 166 and 182 of the shot sleeve 130 also advantageously facilitate rearward movement of the piston through the piston bore 136.

Other configurations are possible. For example, although in the embodiment described above, the shot sleeve comprises a sleeve insert and a sleeve liner, in other embodiments, the shot sleeve may alternatively not comprise a sleeve insert. In one such embodiment, the sleeve liner may alternatively extend the length of the axial bore such that the sleeve liner defines the piston bore surface.

Although in the embodiment described above, the axial bore extending through the body comprises a first axial bore segment and a second axial bore segment, with the first axial bore segment having a larger diameter than the second axial bore segment, in other embodiments, the second axial bore segment may alternatively have the same or greater diameter than the first axial bore segment. In one such embodiment, the thickness of the sleeve insert may alternatively be the same or less than the thickness of the sleeve liner.

Although in the embodiment described above, the sleeve liner and the sleeve insert each have a nitride surface layer, in other embodiments, one or both of the sleeve liner and the sleeve insert may alternatively have no nitride surface layer.

Although in the embodiment described above, the sleeve liner is formed by welding a layer of steel onto the surface of the second axial bore segment of the body, in other embodiments, the sleeve liner may alternatively be formed by joining the layer of steel onto the body using one or more other methods, such as: brazing, physical vapour deposition (PVD), sputter deposition, pulsed laser deposition, electron beam physical vapour deposition, and the like.

The materials are not limited to those of the embodiment described above, and in other embodiments, one or more of the body, the sleeve insert and the sleeve liner may alternatively be fabricated of another grade of steel, or of another metal alloy or other material. For example, the body may alternatively be fabricated of DIN 1.2344 grade (AISI H13 grade) steel. In still other embodiments, one or both of the sleeve insert and the sleeve liner may alternatively be fabricated of another material having at least one of: a higher hardness than the body; a higher high-temperature yield strength than the body; and a higher aluminum corrosion resistance than the body.

Although embodiments have been described above with reference to the accompanying drawings, those of skill in the art will appreciate that variations and modifications may be made without departing from the scope thereof as defined by the appended claims.

What is claimed is:

1. A shot sleeve for a die-casting apparatus, the shot sleeve having a piston bore, the shot sleeve comprising:
    an elongate body having an axial bore;
    a sleeve liner formed on a surface of the axial bore, the sleeve liner defining a surface of the piston bore; and
    a sleeve insert accommodated in the axial bore and abutting the sleeve liner, the sleeve insert defining an additional surface of the piston bore, wherein the sleeve insert comprises an axial cut configured to allow the sleeve insert to be circumferentially compressed.

2. The shot sleeve of claim 1, wherein the sleeve liner comprises a nitride surface layer defining the surface of the piston bore.

3. The shot sleeve of claim 1, wherein the elongate body is fabricated of a first material and the sleeve liner is fabricated of a second material, the second material having at least one of:
    higher hardness than the first material;
    higher high-temperature yield strength than the first material; and
    higher aluminum corrosion resistance than the first material.

4. The shot sleeve of claim 3, wherein the body is fabricated of AISI 4340 grade steel.

5. The shot sleeve of claim 3, wherein the sleeve liner is fabricated of hot worked DIN 1.2367 grade steel.

6. The shot sleeve of claim 1, wherein the sleeve liner is integrally formed on the surface of the axial bore.

7. The shot sleeve of claim 1, wherein the sleeve liner is a welded layer.

8. The shot sleeve of claim 1, wherein the axial bore comprises a first axial bore segment and a second axial bore segment, the first axial bore segment accommodating the sleeve insert, and the sleeve liner being formed on the surface of the second axial bore segment.

9. The shot sleeve of claim 1, wherein the body comprises a port, the sleeve insert having an aperture aligned with the port.

10. The shot sleeve of claim 1, wherein the sleeve insert comprises a nitride surface layer defining the additional surface of the piston bore.

11. The shot sleeve of claim 1, wherein the elongate body is fabricated of a first material and the sleeve insert is fabricated of a second material, the second material having at least one of:
    higher hardness than the first material;
    higher high-temperature yield strength than the first material; and
    higher aluminum corrosion resistance than the first material.

12. The shot sleeve of claim 11, wherein the body is fabricated of AISI 4340 grade steel.

13. The shot sleeve of claim 11, wherein the sleeve insert is fabricated of hot worked DIN 1.2367 grade steel.

14. A die-casting apparatus comprising the shot sleeve of claim 1.

15. A method of fabricating a shot sleeve for a die-casting apparatus, the shot sleeve having a piston bore, the method comprising:
    providing an elongate shot sleeve body having an axial bore;

forming a sleeve liner on a surface of the axial bore, the sleeve liner defining a surface of the piston bore; and inserting a sleeve insert into the axial bore against the sleeve liner in an abutting manner, the sleeve insert defining an additional surface of the piston bore, wherein the sleeve insert comprises an axial cut configured to allow the sleeve insert to be circumferentially compressed.

16. The method of claim 15, wherein the forming comprises forming the sleeve liner by welding.

17. The method of claim 15, further comprising:
subjecting the shot sleeve to heat treatment after said forming to reduce residual stress.

18. The method of claim 15, further comprising conically boring the axial bore to form a conical surface.

19. The method of claim 15, further comprising:
honing a surface of the sleeve liner to a desired surface roughness.

20. The method of claim 19, further comprising:
forming a nitride surface layer on the sleeve liner after honing.

* * * * *